United States Patent
Kim et al.

(10) Patent No.: US 12,442,092 B2
(45) Date of Patent: Oct. 14, 2025

(54) WATER ELECTROLYSIS SYSTEM IMPROVING DURABILITY BY PREVENTING PERFORMANCE DEGRADATION INSIDE WATER ELECTROLYSIS STACK

(71) Applicant: ACROLABS INC., Seongnam-si (KR)

(72) Inventors: Ho Suk Kim, Seongnam-si (KR); Hye Young Shin, Seoul (KR)

(73) Assignee: ACROLABS INC., Seongnam-si (KR)

( * ) Notice: Subject to any disclaimer, the term of this patent is extended or adjusted under 35 U.S.C. 154(b) by 0 days.

(21) Appl. No.: 18/631,990

(22) Filed: Apr. 10, 2024

(65) Prior Publication Data

US 2024/0263321 A1 Aug. 8, 2024

Related U.S. Application Data (63) Continuation of application No. 18/277,326, filed as application No. PCT/KR2021/007031 on Jun. 4, 2021, now abandoned.

(30) Foreign Application Priority Data

Jun. 4, 2021 (KR) .......................... 10-2021-0072498

(51) Int. Cl.
*C25B 9/65* (2021.01)
*C25B 1/04* (2021.01)
(Continued)

(52) U.S. Cl.
CPC .................. *C25B 9/65* (2021.01); *C25B 1/04* (2013.01); *C25B 9/67* (2021.01); *C25B 9/77* (2021.01);
(Continued)

(58) Field of Classification Search
CPC ........ C25B 15/027; C25B 15/021; C25B 9/67; C25B 1/02
See application file for complete search history.

(56) References Cited

U.S. PATENT DOCUMENTS

| 5,346,778 A | 9/1994 | Ewan |
| 5,690,797 A | 11/1997 | Harada |
(Continued)

FOREIGN PATENT DOCUMENTS

| JP | H10-99861 A | 4/1998 |
| JP | 2010-121146 A | 6/2010 |
(Continued)

OTHER PUBLICATIONS

Machine translation of WO2017200130 of Ahn et al (Year: 2017).*
(Continued)

*Primary Examiner* — Brian W Cohen
(74) *Attorney, Agent, or Firm* — Sughrue Mion, PLLC (57) ABSTRACT

Disclosed is a water electrolysis system that improves durability by preventing performance degradation inside a water electrolysis stack. According to the present invention, in order to reduce electrode degradation in a water electrolysis unit cell, which can frequently occur in the starting and stopping stages of a process for producing hydrogen from the water electrolysis system, power of a constant current is supplied to the water electrolysis stack and electrolyte circulating water is heated while being circulated in the water electrolysis stack in the starting stage of the water electrolysis system. Also, when performing a stopping process, power of a constant current is supplied to the water electrolysis stack and electrolyte circulating water is cooled while being circulated in the water electrolysis stack. Accordingly, it is possible to improve durability by preventing performance degradation inside the water electrolysis stack.

4 Claims, 3 Drawing Sheets

(51) Int. Cl.
  *C25B 9/67* (2021.01)
  *C25B 9/77* (2021.01)
  *C25B 15/021* (2021.01)
  *C25B 15/027* (2021.01)
  *C25B 15/029* (2021.01)
  *C25B 15/08* (2006.01)

(52) U.S. Cl.
  CPC .......... *C25B 15/021* (2021.01); *C25B 15/027* (2021.01); *C25B 15/029* (2021.01); *C25B 15/085* (2021.01); *C25B 15/087* (2021.01)

(56) References Cited

U.S. PATENT DOCUMENTS

| | | | | |
|---|---|---|---|---|
| 8,709,221 | B1 * | 4/2014 | Smith | ........................ C25B 9/65 204/278 |
| 2006/0118428 | A1 | 6/2006 | Baltrucki | |
| 2013/0048507 | A1 | 2/2013 | Kurashina | |
| 2015/0090603 | A1 | 4/2015 | Kurashina et al. | |

FOREIGN PATENT DOCUMENTS

| | | |
|---|---|---|
| JP | 2012-153965 A | 8/2012 |
| JP | 2020-176309 A | 10/2020 |
| JP | 2020-196920 A | 12/2020 |
| KR | 10-2020-0127076 A | 11/2020 |
| WO | 2017200130 A1 | 11/2017 |

OTHER PUBLICATIONS

Machine translation of JP2012153965 of Kurashina et al (Year: 2012).*

International Search Report for PCT/KR2021/007031 dated Feb. 28, 2022.

Korean Office Action—Decision of Grant for KR 10-2021-0072498 dated May 31, 2023.

Korean Office Action for KR 10-2021-0072498 dated Mar. 27, 2023.

Machine translation of WO2017200130 of Ahn et al (Year: 2017).

* cited by examiner

WATER ELECTROLYSIS SYSTEM IMPROVING DURABILITY BY PREVENTING PERFORMANCE DEGRADATION INSIDE WATER ELECTROLYSIS STACK

CROSS REFERENCE TO RELATED APPLICATIONS

This is a Continuation application of U.S. application Ser. No. 18/277,326 filed Aug. 15, 2023, which is a National Stage of International Application No. PCT/KR2021/007031 filed Jun. 4, 2021, claiming priority based on Korean Patent Application No. 10-2021-0072498 filed Jun. 4, 2021, the entire disclosures of which are incorporated herein by reference.

TECHNICAL FIELD

The present invention relates to a water electrolysis system of which durability improved by preventing performance degradation of an inner portion of a water electrolysis stack, and more specifically, to a water electrolysis system of which durability is improved by preventing performance degradation of an inner portion of a water electrolysis stack, wherein, in order to reduce electrode degradation of a water electrolysis unit cell which may frequently occur in a start operation and a shut down operation in a process in which the water electrolysis system produces hydrogen, power with a predetermined current is supplied to the water electrolysis stack, and electrolyte circulating water is circulated to the water electrolysis stack while heated in the start operation, power with a predetermined current is supplied to the water electrolysis stack, and the electrolyte circulating water is circulated to the water electrolysis stack while cooled in the shut down operation.

BACKGROUND ART

Recently, as supply of renewable energy sources such as solar and wind power plants, hydrogen fuel cell vehicles using hydrogen, and fuel cells for power generation have expanded, a use rate of the renewable energy sources has increased, hydrogen is being used as an energy carrier from a viewpoint of energy storage, and thus the importance of a durable water electrolysis system technology has been highlighted.

Methods of producing hydrogen using water electrolysis include an acidic and alkaline water electrolysis method, a proton exchange membrane (PEM) water electrolysis method using an ion-exchange membrane, and a high-temperature water vapor-type water electrolysis method, and there is an anion exchange membrane (AEM) water electrolysis method of which a structure is similar to that of the PEM water electrolysis method and an operating environment is derived from a technology of the alkaline water electrolysis method.

Among them, in the alkali electrolyte (NaOH or KOH) water electrolysis method, commercialization is active due to high technological maturity, a structure is simple, a non-precious metal catalyst is used, a manufacturing cost is low, and thus a large-scale structure in units of megawatts can be formed, but, there is a problem of continuously supplementing an electrolyte in order to maintain a concentration of an alkali electrolyte, and there are disadvantages of a corrosion problem of the alkaline electrolyte, a low current density, a low efficiency, and the impossibility of high-pressure operation.

In addition, in the PEM water electrolysis method, operation is performed at a high current density using a platinum group catalyst and a polyelectrolyte PEM, and thus an apparatus can be miniaturized, hydrogen can be produced at high pressure due to a simple system structure, and durability is superior because of using a precious metal which is not corrosive under an acidic condition, however, there is a disadvantage of a high cost of the precious metal used as the catalyst.

In addition, in the AEM water electrolysis method, a stack structure is similar to that of the PEM water electrolysis method, high-purity hydrogen is produced at a high pressure, operation is performed at a relatively high current density, a system is operated in an alkaline environment, and thus a low-cost non-precious metal catalyst may be used.

When various types of water electrolysis systems are operated, it is very important to prevent a reverse current of a water electrolysis stack occurring in a start operation and a shut down operation.

To this end, a technology is proposed in Korean Registered Patent No. 10-1724060 (Title: ALKALINE WATER ELECTROLYSIS DEVICE AND DRIVING METHOD THEREOF, hereafter, referred to as "Related Art 1"), that is a conventional related art, includes a water electrolysis stack which includes a plurality of membrane-electrode assemblies and electrolyzes an alkali aqueous solution supplied from an electrolyte tank to generate hydrogen and oxygen, a voltage supply which outputs a voltage required for electrolysis to the water electrolysis stack, a voltage consuming device which is electrically connected to the water electrolysis stack to consume and remove a residual voltage of the water electrolysis stack when there is no load on the water electrolysis stack, and a control unit which controls operation of the water electrolysis stack, the voltage supply, and the voltage consuming device, and the voltage consuming device provided as an auxiliary heater installed in the electrolyte tank.

In Related Art 1 having the above-described structure, a method is proposed that the water electrolysis stack, the voltage supply, the voltage consuming device, and the control unit are provided, and the voltage consuming device is electrically connected to the water electrolysis stack to consume and remove the residual voltage when there is no load on the water electrolysis stack in a shut down operation of a water electrolysis device, however, there is a problem that a method of fundamentally preventing a reverse current of the water electrolysis stack occurring frequently in a start operation and the shut down operation during operation of a water electrolysis system is not provided.

DISCLOSURE

Technical Problem

Therefore, an embodiment is directed to providing a water electrolysis system of which durability is improved by preventing performance degradation of an inner portion of a water electrolysis stack, wherein, in order to reduce electrode degradation of a water electrolysis unit cell which may occur frequently in a start operation and a shut down operation in a process in which the water electrolysis system produces hydrogen, power with a predetermined current is supplied to the water electrolysis stack, and electrolyte circulating water is circulated to the water electrolysis stack while heated in the start operation of the water electrolysis system, and power with a predetermined current is supplied to the water electrolysis stack, and the electrolyte circulating water is circulated to the water electrolysis stack while cooled in the shut down operation to prevent performance degradation of the inner portion of the water electrolysis stack.

In addition, an embodiment is directed to providing a water electrolysis system of which durability is improved by preventing performance degradation of an inner portion of a water electrolysis stack, wherein, in order to prevent performance degradation which occurs frequently in a start operation and a shut down operation when the water electrolysis system is operated, the water electrolysis stack is heated at a predetermined temperature, and power with a predetermined current is supplied to the water electrolysis stack during cooling to prevent a reverse current generated in a stack unit cell so as to suppress water electrolysis catalyst electrode degradation.

In addition, an embodiment is directed to providing a water electrolysis system of which durability is improved by preventing performance degradation of an inner portion of a water electrolysis stack, wherein, after a temperature of the water electrolysis stack is lowered in a shut down operation, a cell voltage reducer lowers a residual voltage of the water electrolysis stack to a predetermined voltage, power supply is stopped in a range in which a pressure of a hydrogen generating portion is higher than a pressure of an oxygen generating portion, and circulation of electrolyte circulating water is stopped for a predetermined time period to suppress hydrogen generating portion catalyst degradation.

In addition, an embodiment is directed to providing a water electrolysis system of which durability is improved by preventing performance degradation of an inner portion of a water electrolysis stack, wherein, even in an idle period in which the water electrolysis system is not used, in a range in which a pressure of a hydrogen generating portion is higher a pressure of an oxygen generating portion, power supply is stopped, and circulation of electrolyte circulating water is stopped for a predetermined time period to lower a residual voltage of the water electrolysis stack to a predetermined voltage.

Technical Solution

One aspect of the present invention provides a water electrolysis system of which durability is improved by preventing performance degradation of an inner portion of a water electrolysis stack, the water electrolysis system comprising a water electrolysis stack having a structure in which a plurality of unit cells and separating plates are stacked in series and configured to produce hydrogen and oxygen through a water electrolysis reaction by electric energy; a cell voltage reducer which detects that a cell voltage of the water electrolysis stack is lowered from a predetermined cell operating voltage in real time; a current variable converter which supplies the electric energy to the water electrolysis stack; a breaker which is provided at one side of the current variable converter and blocks current from flowing to a back-pressure regulator and the water electrolysis stack; a circulating water tank which is provided at one side of the water electrolysis stack and supplies circulating water thereto; a liquid pump positioned on an oxygen generation line on which oxygen is generated at an anode (OER; oxygen evolution reaction) electrode of the water electrolysis stack and configured to circulate circulating water, which is an electrolyte; a pressure sensor provided at front end of the water electrolysis stack; a flow sensor provided at one side of the pressure sensor and configured to detect a flow rate of the circulating water; a temperature sensor which is provided at rear end of the water electrolysis stack to monitor an increase in a temperature of the circulating water at the rear end of the water electrolysis stack due to a mixing phenomenon of hydrogen and oxygen when a pinhole is generated in an ion-exchange membrane; an air-cooled heat exchanger which maintains a constant temperature of the circulating water tank; a water electrolysis system controller which detects a dangerous state due to the mixing phenomenon of hydrogen and oxygen; a circulating water auxiliary tank which supplies as much water as an amount of water consumed in the circulating water tank in real time; a cooling heat exchanger which cools hydrogen produced at a cathode (HER; hydrogen evolution reaction) electrode of the water electrolysis stack; a pressurizer which is provided on a hydrogen production line and prevents water coming through the ion-exchange membrane from a side of the anode electrode toward the cathode electrode; a check valve which prevents water from flowing back through the ion-exchange membrane; a water separator which separates a small amount of moisture transferred with hydrogen; an absorber positioned at one side of the water separator; a microfilter which is provided at one side of the absorber and allows high-purity hydrogen to be obtained with the absorber; a pressure sensor provided at rear end of the water electrolysis stack; the back-pressure regulator provided at one side of the pressure sensor and adjusts a hydrogen production pressure; and an explosion-proof oxygen sensor which detects a concentration of oxygen in produced hydrogen gas, wherein, in a start process of the water electrolysis system, the electrolyte circulating water of the water electrolysis stack is circulated while heated to a predetermined temperature, and power with a predetermined current is supplied to the water electrolysis stack until the temperature of the electrolyte circulating water reaches the predetermined temperature; and in a shut down process of the water electrolysis system, power with a predetermined current is supplied to the water electrolysis stack, and the electrolyte circulating water is cooled to a predetermined temperature.

A current supplied to the water electrolysis stack may be in a range of 10 mA/cm$^2$ to 50 mA/cm$^2$ based on an active area of the water electrolysis stack.

In the shut down process of the water electrolysis system, a power supply may be stopped in a region where a temperature of the electrolysis circulating water is 40° C. or less, and a pressure of a hydrogen generating part of the water electrolysis stack is higher than a pressure of an oxygen generating part of the water electrolysis stack, the cell voltage reducer may lower a voltage of the water electrolysis stack to a predetermined voltage, and the circulation of the electrolyte circulating water may be stopped for a predetermined time period.

A time period for which the circulation of the electrolyte circulating water is stopped may be in a range of 10 seconds to 30 seconds.

A voltage causing the voltage of the water electrolysis stack to be lowered may allow a voltage of the plurality of unit cells constituting the water electrolysis stack to be lowered to a range of 0.3 V to 0.5 V.

Advantageous Effects

According to a water electrolysis system of which durability is improved by preventing performance degradation of an inner portion of a water electrolysis stack of the present invention, in order to reduce electrode degradation of a water electrolysis unit cell which may occur frequently in a start operation and a shut down operation in a process in which the water electrolysis system produces hydrogen, power with a predetermined current is supplied to the water electrolysis stack, and electrolyte circulating water is circulated to the water electrolysis stack while heated in the start operation of the water electrolysis system, and power with a predetermined current is supplied to the water electrolysis stack, and the electrolyte circulating water is circulated to the water electrolysis stack while cooled in the shut down operation to prevent performance degradation of the inner portion of the water electrolysis stack, and thus performance degradation of an inner portion of the water electrolysis stack can be prevented to significantly improve durability.

In addition, according to the present invention, in order to prevent performance degradation which occurs frequently in a start operation and a shut down operation when a water electrolysis system is operated, a water electrolysis stack is heated at a predetermined temperature, and power with a predetermined current is supplied to the water electrolysis stack during cooling to prevent a reverse current generated in a stack unit cell so as to suppress water electrolysis catalyst electrode degradation, and thus performance degradation of an inner portion of the water electrolysis stack can be prevented to improve durability.

In addition, according to the present invention, after a temperature of a water electrolysis stack is lowered in a shut down operation, a cell voltage reducer lowers a residual voltage of the water electrolysis stack to a predetermined voltage, power supply is stopped in a range in which a pressure of a hydrogen generating portion is higher than a pressure of an oxygen generating portion, and circulation of electrolyte circulating water is stopped for a predetermined time period to suppress hydrogen generating portion catalyst degradation, and thus performance degradation of an inner portion of the water electrolysis stack can be prevented to improve durability.

In addition, even in an idle period in which a water electrolysis system is not used, in a range in which a pressure of a hydrogen generating portion is higher a pressure of an oxygen generating portion, power supply is stopped, and circulation of electrolyte circulating water is stopped for a predetermined time period to lower a residual voltage of a water electrolysis stack to a predetermined voltage, and thus performance degradation of an inner portion of the water electrolysis stack can be prevented to improve durability.

BEST MODE OF THE INVENTION

According to a most exemplary embodiment of a water electrolysis system of which durability is improved by preventing performance degradation of an inner portion of a water electrolysis stack, the water electrolysis system may include a water electrolysis stack having a structure in which a plurality of unit cells and separating plates are stacked in series and configured to produce hydrogen and oxygen through a water electrolysis reaction by electric energy, a cell voltage reducer which detects that a cell voltage of the water electrolysis stack is lowered from a predetermined cell operating voltage in real time, a current variable converter which supplies the electric energy to the water electrolysis stack, a breaker which is provided at one side of the current variable converter and blocks current from flowing to a back-pressure regulator and the water electrolysis stack, a circulating water tank which is provided at one side of the water electrolysis stack and supplies circulating water thereto, a liquid pump positioned on an oxygen generation line on which oxygen is generated at an anode (OER; oxygen evolution reaction) electrode of the water electrolysis stack and configured to circulate circulating water, which is an electrolyte, a pressure sensor provided at front end of the water electrolysis stack, a flow sensor provided at one side of the pressure sensor and configured to detect a flow rate of the circulating water, a temperature sensor which is provided at rear end of the water electrolysis stack to monitor an increase in a temperature of the circulating water at the rear end of the water electrolysis stack due to a mixing phenomenon of hydrogen and oxygen when a pinhole is generated in an ion-exchange membrane, an air-cooled heat exchanger which maintains a constant temperature of the circulating water tank, a water electrolysis system controller which detects a dangerous state due to the mixing phenomenon of hydrogen and oxygen, a circulating water auxiliary tank which supplies as much water as an amount of water consumed in the circulating water tank in real time, a cooling heat exchanger which cools hydrogen produced at a cathode (HER; hydrogen evolution reaction) electrode of the water electrolysis stack, a pressurizer which is provided on a hydrogen production line and prevents water coming through the ion-exchange membrane from a side of the anode electrode toward the cathode electrode, a check valve which prevents water from flowing back through the ion-exchange membrane, a water separator which separates a small amount of moisture transferred with hydrogen, an absorber positioned at one side of the water separator, a microfilter which is provided at one side of the absorber and allows high-purity hydrogen to be obtained with the absorber, a pressure sensor provided at rear end of the water electrolysis stack, the back-pressure regulator provided at one side of the pressure sensor and adjusts a hydrogen production pressure, and an explosion-proof oxygen sensor which detects a concentration of oxygen in produced hydrogen gas, wherein, in a start process of the water electrolysis system, the electrolyte circulating water of the water electrolysis stack is circulated while heated to a predetermined temperature, and power with a predetermined current is supplied to the water electrolysis stack until the temperature of the electrolyte circulating water reaches the predetermined temperature, and in a shut down process of the water electrolysis system, power with a predetermined current is supplied to the water electrolysis stack, and the electrolyte circulating water is cooled to a predetermined temperature.

Modes of the Invention

Advantages and features of the present invention, and methods of achieving the same should be clearly understood with reference to the accompanying drawings and the following detailed embodiments.

However, the present invention is not limited to the embodiments which will be disclosed, but may be implemented in various different forms. The embodiments are provided in order to fully explain the present invention and fully explain the scope of the present invention to those skilled in the art. The scope of the present invention is defined by the appended claims. Throughout the specification, the same reference number refers to the same component in the drawings.

Therefore, in some embodiments, well-known processes, well-known structures, and well-known techniques are not specifically described to avoid the present invention being interpreted ambiguously.

Meanwhile, the terms used herein are provided to describe the embodiments of the present invention and not for purposes of limitation. In the specification, unless the context clearly indicates otherwise, the singular forms include the plural forms.

The terms "comprise" and/or "comprising" used in the specification specify some described components, steps, operations, and/or elements but do not preclude the presence or addition of one or more other components, steps, operations, and/or elements.

In addition, "and/or" includes each described item and all combinations of one or more of described items.

In addition, the embodiments described in the present specification will be described with reference to exemplary cross-sectional and schematic views.

Therefore, the embodiments of the present invention are not limited to illustrated specific forms and include changes in form manufactured through manufacturing processes.

In addition, in each drawing illustrated in the present invention, each component may be illustrated somewhat enlarged or reduced in consideration of the convenience of description.

Hereafter, exemplary embodiments of the present invention will be described in detail with reference to the accompanying drawings.

Figure 1:
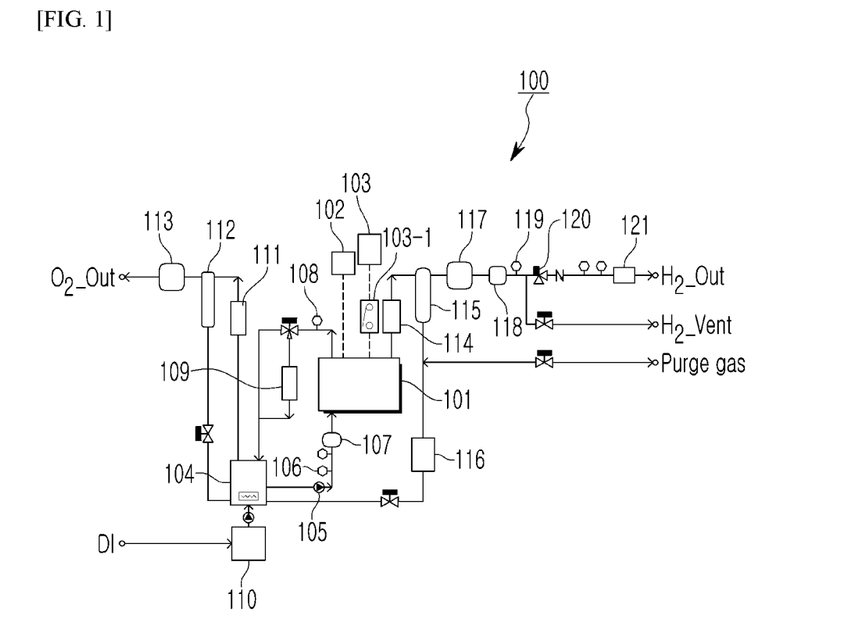
FIG. 1 is a schematic block diagram illustrating a configuration of a water electrolysis system of which durability is improved by preventing performance degradation of an inner portion of a water electrolysis stack according to the present invention.
Figure 2:
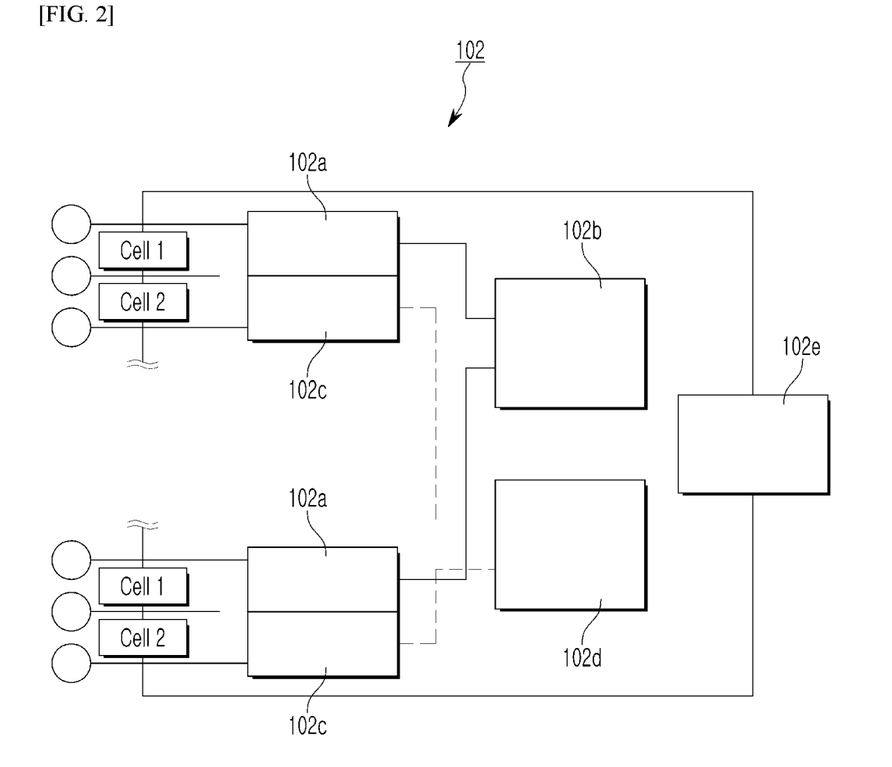
FIG. 2 is a block diagram illustrating a configuration of a cell voltage reducer according to the present invention.
Figure 3:
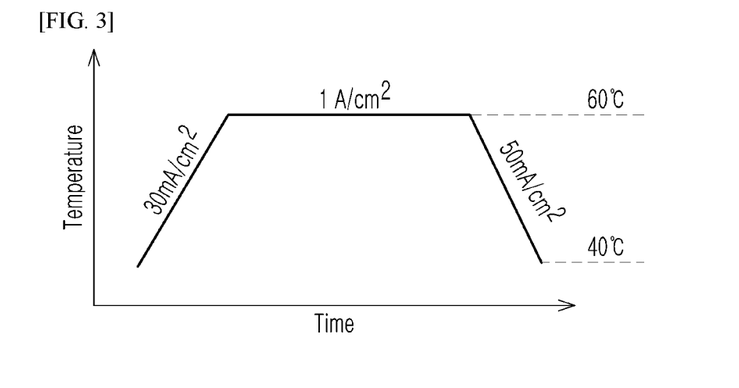
FIG. 3 is a graph showing a change in temperature during heating according to operation of the durable water electrolysis system according to the present invention.
Figure 4:
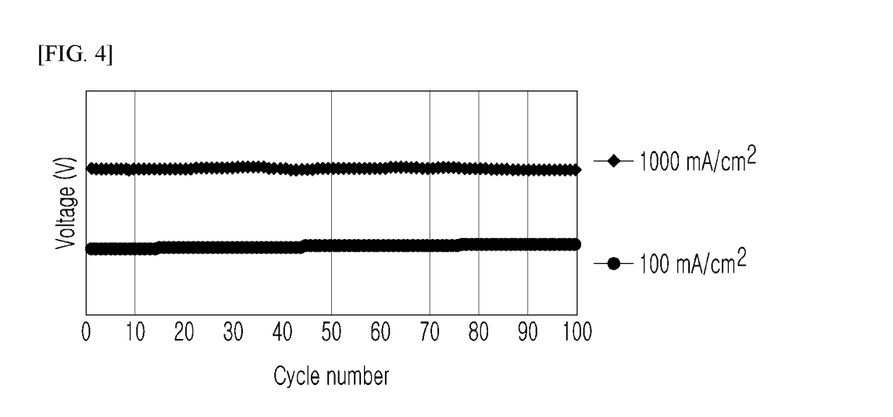
FIG. 4 is a graph showing a state in which a reverse current is prevented when the durable water electrolysis system is started and shut down according to the present invention.
Figure 5:
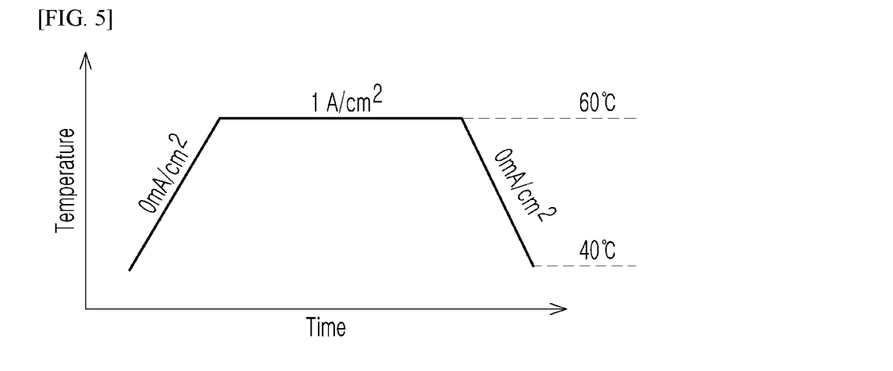
FIG. 5 is a graph showing a change in temperature during heating according to operation of a water electrolysis system according to a conventional technology.
Figure 6:
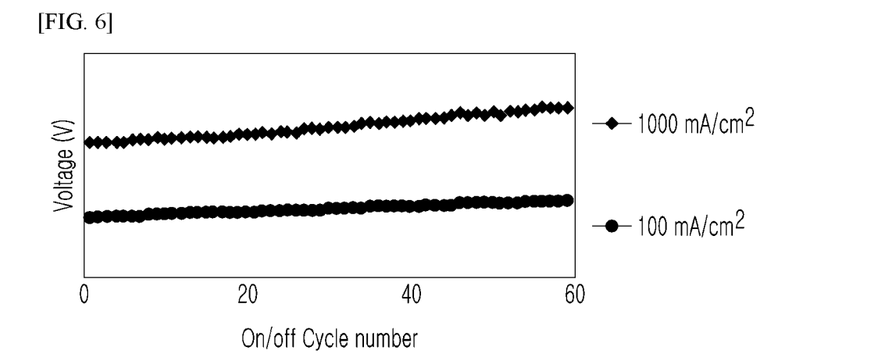
FIG. 6 is a graph showing a state in which a reverse current is generated when the water electrolysis system is started and shut down according to the conventional technology.

FIG. 1 is a schematic block diagram illustrating a configuration of a water electrolysis system of which durability is improved by preventing performance degradation of an inner portion of a water electrolysis stack according to the present invention, and FIG. 2 is a block diagram illustrating a configuration of a cell voltage reducer according to the present invention. FIG. 3 is a graph showing a change in temperature during heating according to operation of the durable water electrolysis system according to the present invention, and FIG. 4 is a graph showing a state in which a reverse current is prevented when the durable water electrolysis system is started and shut down according to the present invention. FIG. 5 is a graph showing a change in temperature during heating according to operation of a water electrolysis system according to a conventional technology, and FIG. 6 is a graph showing a state in which a reverse current is generated when the water electrolysis system is started and shut down according to the conventional technology.

As illustrated in FIG. 3, a water electrolysis stack 101 has a structure in which a plurality of unit cells (membrane-electrode assemblies) and separating plates are stacked in series and produces hydrogen and oxygen through a water electrolysis reaction of electric energy and water.

Each of the water electrolysis unit cells (membrane-electrode assembly) includes an electrode, an electrolyte, an ion-exchange membrane (diaphragm), and the like, and as in a following reaction formular, in a reduction zone, electrons supplied from an external power source and water (H2O) react to generate hydrogen gas and OH—, and the OH— moves to an oxidation zone through the ion-exchange membrane (diaphragm) to generate water (H2O) and oxygen gas.

A normal operating voltage of the unit cells constituting the water electrolysis stack 101 ranges from 1.5 V to 2.1 V, and generation of a reversal potential by a reverse current due to activation of an oxygen generation catalyst, presence of water, and heat source imbalance which frequently occurs in a start operation and a shut down operation when the water electrolysis system is operated may adversely affect water electrolysis performance such as electrode degradation.

A cell voltage reducer 102 serves to detect that a cell voltage of the water electrolysis stack 101 decreases to be lower than a predetermined cell operating voltage in real time.

As illustrated in FIG. 2, the cell voltage reducer 102 may include cell voltage comparators 102a which monitor the unit cells, a cell low voltage alarm 102b installed to be connected to the cell voltage comparators 102a, cell dischargers 102c, a discharge controller 102d, and a cell voltage/current detector 102e.

The cell voltage comparators 102a are provides as a plurality of cell voltage comparators 102a and serve to monitor the plurality of unit cells including at least one unit cell constituting the water electrolysis stack 101.

The cell low voltage alarm 102b is installed to be connected to the cell voltage comparators 102a.

Each of the cell dischargers 102c has a structure positioned at one side of the cell voltage comparator 102a, and the discharge controller 102d is installed to be connected to the cell dischargers 102c.

The cell voltage/current detector 102d is connected to two ends of the unit cells of the water electrolysis stack.

In the cell voltage reducer 102 having such a structure, the cell low voltage alarm 102b may detect that a cell voltage decreases to be lower than a predetermined operating voltage in real time, and when the water electrolysis system is shut down, a plurality of cell dischargers 102c and the discharge controller 102d connected to the cell dischargers 102c may remove a residual voltage.

In the cell voltage reducer 102, each of the cell voltage comparators 102a may be connected to one unit cell, four unit cells, or eight unit cells, and when the cell voltage/current detector 102d detects a predetermined overvoltage or overcurrent value of the entire water electrolysis stack 101, a water electrolysis system controller may shut down the water electrolysis system.

More specifically, the cell low voltage alarm connected to each of the plurality of cell voltage comparators which monitors two of the plurality of unit cells constituting the water electrolysis stack 101 may detect that a cell voltage is lowered to be smaller than a predetermined operating voltage in real time, the discharge controller connected to the plurality of cell dischargers may remove a residual voltage when the water electrolysis system is shut down, and the cell voltage/current detector connected to two ends of a cell 1 and a cell n of the water electrolysis stack may monitor a voltage and a current of the entire water electrolysis stack.

In addition, each of the cell voltage comparators of the cell voltage reducer of the water electrolysis system may be connected to one unit cell, four unit cells, or eight unit cells, and when the cell voltage/current detector detects a predetermined overvoltage or overcurrent value of the water electrolysis stack, the water electrolysis system controller may shut down the water electrolysis system.

In addition, a current variable converter 103 supplies electrical energy necessary for operation of the water electrolysis stack 101.

When the water electrolysis system is operated, the converter 103 which supplies the electric energy to the water electrolysis stack 101 from the outside and the cell voltage reducer 102 which detects that a cell voltage of the water electrolysis stack is lowered from a predetermined cell operating voltage in real time may detect a water electrolysis stack cell voltage reduction phenomenon due to a mixing phenomenon of hydrogen and oxygen in the water electrolysis stack at which a cause thereof is generated first and shut down the system.

An operating cell voltage for shutting down the water electrolysis system having the above-described structure may range from 1.5 V to 1.45 V.

That is, when it is considered that a theoretical potential of the cell voltage which shuts down the water electrolysis system is 1.229V, the water electrolysis system may be shut down when an operating cell voltage of the water electrolysis stack ranges from 1.2V to 1.45V.

Meanwhile, according to a water electrolysis system 100, of which durability is improved by preventing performance degradation of the inner portion of the water electrolysis stack according to the present invention, an oxygen generation line on which oxygen is generated at an anode (oxygen evolution reaction (OER)) electrode may include a breaker 103-1 which blocks power from being supplied to the water electrolysis stack 101 from the outside when the water electrolysis system is operated, a circulating water tank 104 which supplies circulating water, a liquid pump 105 which circulates the circulating water, a pressure sensor 106 provided at front end of the water electrolysis stack 101, a flow sensor 107 which detects a flow rate of the circulating water, a temperature sensor 108 which is provided at rear end of the water electrolysis stack 101 and monitors whether a temperature of the circulating water is raised or not, and an air-cooled heat exchanger 109 which maintains a temperature of the circulating water tank 104.

A reaction formular of oxygen generated at the anode (OER) electrode according to the present invention is as follows.

[Chemical Formula 1]

$$2OH^- \longrightarrow H_2O + 2e^- + (1/2)O_2(-0.828 \text{ V vs SHE})$$

The circulating water tank 104 is provided at one side of the water electrolysis stack 101 and supplies the circulating water toward the water electrolysis stack 101.

The circulating water tank 104 has a double partition structure which separates oxygen contained in the circulating water, and the circulating water tank 104 has the double partition structure which separates oxygen contained in the circulating water.

The circulating water tank 104 may further include a heater (not shown) which raises a temperature of the circulating water during an initial operation and a level sensor (not shown) which detects a maximum water level and a minimum water level of the circulating water tank 104.

As described above, the circulating water tank 104 serves to receive an amount of current from the water electrolysis system controller (not shown), calculate an amount of water consumption, and accurately supply as much water as the amount of water consumed in the circulating water tank 104 in real time using a metering pump and a circulating water auxiliary tank 110 based on a calculated value of the amount of water consumption.

The liquid pump 105 is positioned on the oxygen generation line on which oxygen is generated at the anode (OER) electrode of the water electrolysis stack 101 and circulates the circulating water which is an electrolyte.

In addition, the pressure sensor 106 is provided at front end of the water electrolysis stack 101, and the flow sensor 107 is provided at one side of the pressure sensor 106 to detect a flow rate of the circulating water.

In the flow sensor 107, when the circulating water (electrolyte) is not uniformly circulated due to a malfunction of the water electrolysis system 100 at an oxygen generating electrode of the water electrolysis stack 101, since oxygen generated in an oxygen generation catalytic active range is not easily removed, a pinhole may be generated in the ion-exchange membrane (diaphragm) due to an ununiform reaction.

As described above, the temperature sensor 108, which monitors that a temperature of the circulating water at rear end of the water electrolysis stack may raise due to a mixing phenomenon of hydrogen and oxygen when the pinhole occurs, may be provided, and the water electrolysis system controller may detect a dangerous state of the mixing phenomenon of hydrogen and oxygen due to a malfunction of components of the water electrolysis system and shut down the system.

Meanwhile, the temperature sensor 108 is provided at rear end of the water electrolysis stack 101, and the temperature sensor 108 may be used to monitor an increase in temperature of the circulating water at the rear end of the water electrolysis stack 101 due to the mixing phenomenon of hydrogen and oxygen when the pinhole is generated in the ion-exchange membrane.

The air-cooled heat exchanger 109 may be positioned at one side of the circulating water tank 104 to maintain a constant temperature of the circulating water tank 104.

The water electrolysis system controller according to the present invention serves an important function of detecting a dangerous state due to the mixing phenomenon of hydrogen and oxygen.

Meanwhile, according to the water electrolysis system 100 of which durability is improved by preventing performance degradation of the inner portion of the water electrolysis stack according to the present invention, a hydrogen generation line on which hydrogen is produced at a cathode (hydrogen evolution reaction (HER)) electrode includes a cooling heat exchanger 114 which cools hydrogen, a pressurizer (not shown) which is provided on the hydrogen production line to prevent water from coming through the ion-exchange membrane, a check valve (not shown) which prevents water from flowing back, and a water separator 115 which separates moisture, absorbers 117 each provided at one side of the water separator 115, a microfilter 118 which allows high-purity hydrogen to be obtained, a pressure sensor 119 provided at rear end of the water electrolysis stack 101, and a back-pressure regulator 120 provided at one side of the pressure sensor 119 to adjust a hydrogen production pressure.

A reaction formula of hydrogen produced at the cathode (HER) electrode according to the present invention is as follows.

[Chemical Formula 2]

$$2H_2O \longrightarrow 2e^- + 2OH + H_2 \,(0.401 \text{ V vs SHE})$$

In this case, the cooling heat exchanger 114 serves to cool hydrogen produced at the cathode (HER) electrode of the water electrolysis stack 101.

In addition, the pressurizer (not shown) is provided on the hydrogen production line to prevent water from coming from a side of the anode electrode toward the cathode electrode through the ion-exchange membrane.

That is, since the circulating water (electrolyte) circulates, the pressurizer may be provided on the hydrogen production line to prevent water from coming from the side of the anode electrode toward the cathode (HER) electrode through the ion-exchange membrane.

In addition, the check valve (not shown) serves to prevent water from flowing back through the ion-exchange membrane.

The water separator 115 separates a small amount of moisture transferred with hydrogen, and each of the absorbers 117 is provided at one side of the water separator 115.

Oxygen generated during operation of the water electrolysis system is cooled through the cooling heat exchanger 111, a small amount of circulating water transferred with oxygen is separated by a water separator 112 and collected by the circulating water tank 104, a small amount of moisture is collected by the absorber 113, and thus dried oxygen is discharged to the outside of the water electrolysis system.

The microfilter 118 is provided at one side of the absorbers 117 and allows high-purity hydrogen to be obtained together with the absorbers 117.

Meanwhile, the pressure sensor 119 may be provided at one side of the microfilter 118 to serve to check a pressure of produced hydrogen gas.

In addition, an explosion-proof oxygen sensor 121 which detects a concentration of oxygen which may happen to be contained in the produced hydrogen gas is provided. The back-pressure regulator 120 is provided on the hydrogen production line to prevent water from coming through the ion-exchange membrane from the side of the anode electrode toward the cathode (HER) electrode because the circulating water (electrolyte) circulates, and the check valve for preventing backflow and sensors which may check a temperature and a pressure of produced hydrogen are included therein.

In addition, a purge line for purging nitrogen when the system is initially installed or as necessary is provided, and a hydrogen vent line including a solenoid valve which discharges pressurized hydrogen when the water electrolysis system is not used for a long time period is provided.

The water electrolysis system 100 of which durability is improved by preventing performance degradation of the inner portion of water electrolysis stack according to the present invention may include the water electrolysis system controller (not shown) which detects whether the mixing phenomenon of hydrogen and oxygen is dangerous.

A reaction formular of a water electrolysis reaction of electric energy and water according to the present invention having the above-described structure is as follows.

[Chemical Formula 3]

$$H_2O \longrightarrow H_2 + (1/2) O_2 \,(1.229 \text{ V vs SHE})$$

According to the water electrolysis system 100 of which durability is improved by preventing performance degradation of the inner portion of the water electrolysis stack according to the present invention, a start process of the water electrolysis system may include circulating the electrolyte circulating water of the water electrolysis stack while heating the electrolyte circulating water to a predetermined temperature and supplying power with a predetermined current to the water electrolysis stack until a predetermined temperature is reached, and a shut down process of the water electrolysis system may include supplying power with a predetermined current to the water electrolysis stack and cooling the electrolyte circulating water to a predetermined temperature.

The supplying of the power with the predetermined current is performed in the range of 10 mA/cm2 to 50 mA/cm2 based on an active area of the water electrolysis stack 101.

In addition, the shut down process may further include shut down power supply when a cooling temperature of the water electrolysis stack 101 may be 40° C. or less and in a range in which a pressure of a hydrogen generating portion of the water electrolysis stack is greater than a pressure of an oxygen generating portion, lowering, by the cell voltage reducer, a voltage of the plurality of unit cells constituting the water electrolysis stack to 0.3 V to 0.5 V, and shut down circulation of the electrolyte circulating water for a predetermined time period of 10 seconds to 30 seconds to suppress electrode degradation of a water electrolysis catalyst even during an idle period in which the water electrolysis system is not used for a long time period.

Referring to the graph showing a change in temperature during heating according to operation of the water electrolysis system of the present invention illustrated in FIG. 3 and the graph showing a state in which a reverse current is prevented when the water electrolysis system of the present invention is started and shut down illustrated in FIG. 4, when the water electrolysis system of the present invention is operated 100 cycles as in FIG. 3 in which one cycle includes, in the start operation of the water electrolysis system, circulating the electrolysis circulating water, supplying power with a current of 30 mA/cm² while heating the water electrolysis stack to a predetermined temperature of 60° C., and supplying power with a current density of 1,000 mA/cm² based on a water electrolysis stack catalyst active area to produce hydrogen, and in the shut down operation, supplying power with a current 50 mA/cm², circulating the electrolyte circulating water, and cooling the water electrolysis stack to a predetermined temperature of 40° C., as in FIG. 4, performance of the unit cell of the water electrolysis system is stably maintained in both a high current range of 1,000 mA/cm² and a low current range of 100 mA/cm².

However, according to the conventional technology, referring to a graph showing a change in temperature during heating according to operation of the water electrolysis system of the conventional technology illustrated in FIG. 5 and a graph showing a state in which a reverse current is generated when the water electrolysis system of the conventional technology is started and shut down illustrated in FIG. 6, when the water electrolysis system of the conventional technology is operated 100 cycles as in FIG. 5 in which one cycle includes, in a start operation of the water electrolysis system, circulating electrolyte circulating water, blocking power supply, heating a water electrolysis stack to a predetermined temperature of 60° C., and supplying power with a current density of 1,000 mA/cm² based on a water electrolysis stack catalyst active area to produce hydrogen, and in a shut down operation, blocking power supply, circulating the electrolyte circulating water, and cooling the water electrolysis stack to a predetermined temperature of 40° C., as in FIG. 6, performance degradation of a unit cell of the water electrolysis system occurs in both the high current range of 1,000 mA/cm² and the low current range of 100 mA/cm².

Although an example of an exemplary embodiment of the present invention has been described above, the scope of the present invention is not limited to the specific embodiment, and other embodiments may be proposed by adding, changing, or deleting components within a range clear to those skilled in the art who understands the spirit of the present invention and will fall within a range described in the scope of the present invention.

INDUSTRIAL APPLICABILITY

According to a water electrolysis system of which durability is improved by preventing performance degradation of an inner portion of a water electrolysis stack, the water electrolysis system comprising a water electrolysis stack having a structure in which a plurality of unit cells and separating plates are stacked in series and configured to produce hydrogen and oxygen through a water electrolysis reaction by electric energy, a cell voltage reducer which detects that a cell voltage of the water electrolysis stack is lowered from a predetermined cell operating voltage in real time, a current variable converter which supplies the electric energy to the water electrolysis stack, a breaker which is provided at one side of the current variable converter and blocks current from flowing to a back-pressure regulator and the water electrolysis stack, a circulating water tank which is provided at one side of the water electrolysis stack and supplies circulating water thereto, a liquid pump positioned on an oxygen generation line on which oxygen is generated at an anode (OER; oxygen evolution reaction) electrode of the water electrolysis stack and configured to circulate circulating water, which is an electrolyte, a pressure sensor provided at front end of the water electrolysis stack, a flow sensor provided at one side of the pressure sensor and configured to detect a flow rate of the circulating water, a temperature sensor which is provided at rear end of the water electrolysis stack to monitor an increase in a temperature of the circulating water at the rear end of the water electrolysis stack due to a mixing phenomenon of hydrogen and oxygen when a pinhole is generated in an ion-exchange membrane, an air-cooled heat exchanger which maintains a constant temperature of the circulating water tank, a water electrolysis system controller which detects a dangerous state due to the mixing phenomenon of hydrogen and oxygen, a circulating water auxiliary tank which supplies as much water as an amount of water consumed in the circulating water tank in real time, a cooling heat exchanger which cools hydrogen produced at a cathode (HER; hydrogen evolution reaction) electrode of the water electrolysis stack, a pressurizer which is provided on a hydrogen production line and prevents water coming through the ion-exchange membrane from a side of the anode electrode toward the cathode electrode, a check valve which prevents water from flowing back through the ion-exchange membrane, a water separator which separates a small amount of moisture transferred with hydrogen, an absorber positioned at one side of the water separator, a microfilter which is provided at one side of the absorber and allows high-purity hydrogen to be obtained with the absorber, a pressure sensor provided at rear end of the water electrolysis stack, the back-pressure regulator provided at one side of the pressure sensor and adjusts a hydrogen production pressure, and an explosion-proof oxygen sensor which detects a concentration of oxygen in produced hydrogen gas, wherein, in a start process of the water electrolysis system, the electrolyte circulating water of the water electrolysis stack is circulated while heated to a predetermined temperature, and power with a predetermined current is supplied to the water electrolysis stack until the temperature of the electrolyte circulating water reaches the predetermined temperature, and in a shut down process of the water electrolysis system, power with a predetermined current is supplied to the water electrolysis stack, and the electrolyte circulating water is cooled to a predetermined temperature. Accordingly, in order to reduce electrode degradation of a water electrolysis unit cell which may occur frequently in a start operation and a shut down operation in a process in which the water electrolysis system produces hydrogen, power with a predetermined current is supplied to the water electrolysis stack, and the electrolyte circulating water is circulated to the water electrolysis stack while heated in the start operation of the water electrolysis system, power with a predetermined current is supplied to the water electrolysis stack, and the electrolyte circulating water is circulated to the water electrolysis stack while cooled in the shut down operation, and thus performance degradation of an inner portion of the water electrolysis stack can be prevented to significantly improve durability of the water electrolysis system.

The invention claimed is:
1. A method of operating a water electrolysis system of which durability is improved by preventing performance degradation of an inner portion of a water electrolysis stack, wherein the water electrolysis system comprises:
  the water electrolysis stack (101) having a structure in which a plurality of unit cells and separating plates are stacked in series and configured to produce hydrogen and oxygen through a water electrolysis reaction by electric energy;
  a cell voltage reducer (102) which detects that a cell voltage of the water electrolysis stack (101) is lowered from a predetermined cell operating voltage in real time;
  a current variable converter (103) which supplies the electric energy to the water electrolysis stack (101);
  a breaker (103-1) which is provided at one side of the current variable converter (103) and blocks current from flowing to a back-pressure regulator (120) and the water electrolysis stack (101);
  a circulating water tank (104) which is provided at one side of the water electrolysis stack (101) and supplies circulating water thereto;
  a liquid pump (105) positioned on an oxygen generation line on which oxygen is generated at an anode (OER; oxygen evolution reaction) electrode of the water electrolysis stack and configured to circulate circulating water, which is an electrolyte;

a pressure sensor (106) provided at front end of the water electrolysis stack (101);

a flow sensor (107) provided at one side of the pressure sensor (106) and configured to detect a flow rate of the circulating water;

a temperature sensor (108) which is provided at rear end of the water electrolysis stack (101) to monitor an increase in a temperature of the circulating water at the rear end of the water electrolysis stack (101) due to a mixing phenomenon of hydrogen and oxygen when a pinhole is generated in an ion-exchange membrane;

an air-cooled heat exchanger (109) which maintains a constant temperature of the circulating water tank (104);

a water electrolysis system controller which detects a dangerous state due to the mixing phenomenon of hydrogen and oxygen;

a circulating water auxiliary tank (110) which supplies as much water as an amount of water consumed in the circulating water tank (104) in real time;

a cooling heat exchanger (114) which cools hydrogen produced at a cathode (HER) electrode of the water electrolysis stack (101);

a pressurizer which is provided on a hydrogen production line and prevents water coming through the ion-exchange membrane from a side of the anode electrode toward the cathode electrode;

a check valve which prevents water from flowing back through the ion-exchange membrane;

a water separator (115) which separates moisture transferred with hydrogen;

an absorber (117) positioned at one side of the water separator (115);

a microfilter (118) which is provided at one side of the absorber (117) and allows hydrogen purity to be improved with the absorber (117);

a pressure sensor (119) provided at rear end of the water electrolysis stack (101);

the back-pressure regulator (120) provided at one side of the pressure sensor (119) and adjusts a hydrogen production pressure; and an explosion-proof oxygen sensor (121) which detects a concentration of oxygen in produced hydrogen gas, wherein the method comprises:

in a start process of the water electrolysis system, the electrolyte circulating water of the water electrolysis stack is circulated while heated to a temperature of 60° C., and power with a current of 30 mA/cm2 based on an active area of the water electrolysis stack is supplied to the water electrolysis stack until the temperature of the electrolyte circulating water reaches the temperature of 60° C.; and in a shut down process of the water electrolysis system, power with a current of 50 mA/cm2 based on an active area of the water electrolysis stack is supplied to the water electrolysis stack, and the electrolyte circulating water is cooled to a temperature of 40° C.

2. The method of operating the water electrolysis system of claim 1, wherein, in the shut down process of the water electrolysis system, a power supply is stopped in a region where a temperature of the electrolysis circulating water is 40° C. or less, and a pressure of a hydrogen generating part of the water electrolysis stack is higher than a pressure of an oxygen generating part of the water electrolysis stack;

the cell voltage reducer lowers a voltage of the water electrolysis stack to a predetermined voltage; and the circulation of the electrolyte circulating water is stopped for a predetermined time period.

3. The method of operating the water electrolysis system of claim 2, wherein a time period for which the circulation of the electrolyte circulating water is stopped is in a range of 10 seconds to 30 seconds.

4. The method of operating the water electrolysis system of claim 2, wherein a voltage causing the voltage of the water electrolysis stack to be lowered allows a voltage of the plurality of unit cells constituting the water electrolysis stack to be lowered to a range of 0.3 V to 0.5 V.

\* \* \* \* \*